Nov. 18, 1958  H. W. BOESSENKOOL ET AL  2,860,409
SOLID-PHASE BONDING OF METALS
Filed June 2, 1954
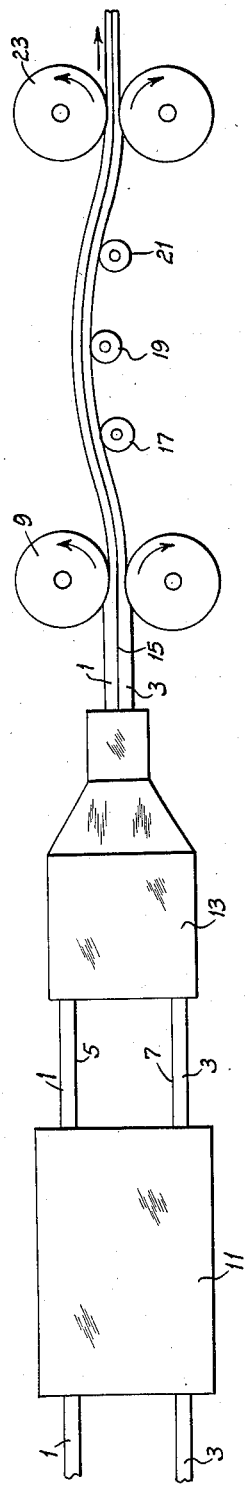
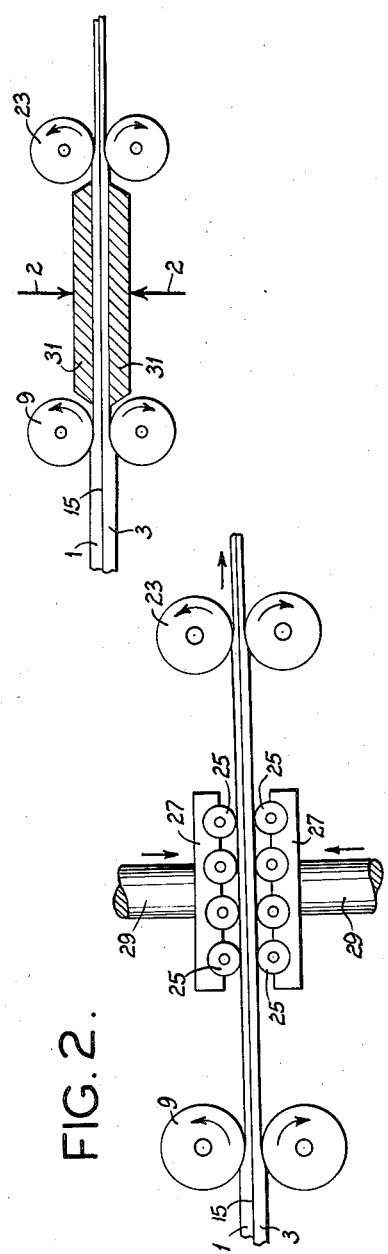
Helmich W. Boessenkool,
George Durst,
Sidney Siegel,
Inventors.
Koenig and Pope,
Attorneys.

United States Patent Office 2,860,409
Patented Nov. 18, 1958

2,860,409

SOLID-PHASE BONDING OF METALS

Helmich W. Boessenkool, South Easton, George Durst, Attleboro, and Sidney Siegel, Sharon, Mass., assignors to Metals & Controls Corporation, Attleboro, Mass., a corporation of Massachusetts Application June 2, 1954, Serial No. 434,013

6 Claims. (Cl. 29—497)

This invention relates to the solid-phase bonding of malleable metals, i. e., to the bonding of malleable metals without the formation of any liquid phase material at the interfaces of the metals being bonded, and more particularly to the bonding of malleable metals to provide multilayer composite metals wherein one layer is permanently bonded over its interfacial area to the contiguous interfacial area of any adjacent layer. The term "metals" is used herein in its broad sense including alloys.

The invention is an improvement upon those described in the United States patent application of Helmich W. Boessenkool and George Durst, Serial No. 204,346, filed January 4, 1951, for Solid Phase Bonding of Metals, matured as Patent 2,691,815, and the application of Helmich W. Boessenkool, George Durst and Sidney Siegel, Serial No. 204,646, filed January 5, 1951, for Solid Phase Bonding of Metals, matured as Patent 2,753,623, information in which is incorporated herein by reference.

Among the several objects of the invention may be noted the provision of methods for solid-phase bonding of metals wherein the deformation required for effecting the desired bond between the metals is undertaken in a series of cumulative steps which are more convenient to manage; the provision of such methods for bonding metals which are readily adaptable to the continuous bonding of long lengths of commercially available strips of metal of substantial width; and the provision of methods for rapidly and continuously solid-phase bonding dissimilar metals wherein the cost of the bonding operations is relatively low, particularly inasmuch as the methods make possible the utilization of deformation equipment of conventional size, even for strips of said substantial widths. Other features will be in part apparent and in part pointed out hereinafter.

We have found that malleable metals can be bonded in the solid phase by means of a series of squeezing or deformation operations (instead of a single deformation operation), wherein the metals step-by-step are reduced in thickness and concomitantly discrete minute or nucleal bonds are formed between the contiguous surfaces. We have found that by a series or sequence of such squeezing operations there is effected an accumulation of such bonds, provided a sufficient number of the bonds formed in initial and subsequent squeezing operations are preserved, with the result that the total number of such bonds becomes sufficient to permit their development by means of a sintering (or heat-treating) operation into a commercially satisfactory bond between the metals. The application of heat up to the recrystallization temperature of the metal having the lowest recrystallization temperature may be employed before the initial squeezing operation or between the squeezing operations to decrease the amount of deformation required for the creation of the minute discrete or nucleal bonds, and may be applied after the initial squeezing operation, for the purpose of preserving or increasing bonds already established. Some metals lack sufficient ductility and malleability to permit hot working above what is commonly referred to as the hot short temperature. If such a metal is used in a combination to be bonded, this application of heat should occur at a temperature not to exceed such hot short temperature, because such metals tend to disintegrate above that temperature. The invention therefore has particular use in the continuous solid-phase bonding of metal strips of substantial width where the bonding would otherwise require equipment of unreasonably large size to effect the necessary deformation for the purpose of forming the bond.

In said patents are described and claimed certain processes for the bonding of metals. We have found, in following the teachings of said patents, that there are certain combinations of metals in which the bond formed by the processes of said applications may be even further improved by a second heavy reduction after the heat-treating operation prescribed in said applications or in some cases before the heat-treating operation. There are other circumstances under which the present invention has additional use.

There are also certain metals which show in heavy reductions a marked tendency to weld to the squeezing means (for example, to the rolls of a rolling mill if that is the squeezing means being used), and while such welding does not deny the teachings of said applications, nevertheless it may be necessary or desirable to minimize it as much as possible. Such may be done by a succession of smaller reductions in accordance with the teaching of the present specification.

Furthermore, final thickness requirements may require starting with such large thickness that the relationship between the starting thickness and the diameter of the work rolls may make it difficult to enter the material between the rolls of a rolling mill if the bonding is to be done by a single pass. In such cases, the teachings herein that bonding may be done by a succession of smaller reductions show how to eliminate this difficulty.

In addition, some metals tend to edge-crack excessively if the total reduction is done at one squeezing operation. Such cracking can be minimized by the processes of this invention.

The invention accordingly comprises the steps and sequence of steps, and features of manipulation which will be exemplified in the methods hereinafter described, and the scope of the application of which will be indicated in the following claims.

Considering our invention in its broadest concept, it consists basically of the following steps:

(1) Preparation of the contiguous surfaces of the metals in order to adapt them to bonding;

(2) Initially squeezing the metals to effect a reduction in thickness and concomitant increase in surface area thereof;

(3) Substantial preservation of the minute discrete or nucleal bonds formed during the initial squeezing operation by physically holding the metal components together against any physical forces tending to separate them;

(4) Additionally squeezing the partially bonded metals to effect the creation of additional minute discrete or nucleal bonds, thereby augmenting and increasing the number of such bonds formed during the initial squeezing operation of step (2);

(5) Repetition, if necessary, of steps 3 and 4 until the number of minute discrete or nucleal bonds thus accumulated is sufficient for development into a commercially satisfactory bond when the metals joined in this manner are sintered; and, (6) Sintering of the accumulated minute discrete or nucleal bonds to cause them to develop into a commercially satisfactory bond over substantially the entire area of the contiguous surfaces of the metals.

Steps 3 and 4 may be repeated as often as desired in order to accumulate a sufficient number of minute discrete or nucleal bonds to make a final satisfactory product after sintering. However, in many instances two squeezing operations are sufficient to create and accumulate the necessary bonds. The total amount of squeezing required for a satisfactory final bond (satisfactory after sintering) may be measured in terms of percentage of reduction in thickness of the metals. The total percentage reduction in thickness required (as disclosed in said applications) is, according to the present invention, apportioned to the respective squeezing operations in any manner desired. For example, a 30% reduction may be achieved in the initial squeezing operation and an additional 30% reduction in the subsequent squeezing operation. Alternatively, the reductions may be unequal. It is only necessary that sufficient reduction be achieved in the initial squeezing operation so that a number of bonds are formed which, combined with additional restraining means, makes it possible to preserve most of the previously formed bonds.

If the squeezing is performed in a rolling mill, the amount of reduction effected initially may or may not be sufficient to create enough of the necessary discrete bonds to prevent so-called alligatoring. Alligatoring is a splitting apart of the metals being joined which tends to occur in response to the forces set up as a result of a rolling operation. According to the present invention this splitting is prevented from occurring between successive reductions, by additional physical or external restraining means which supplies a force in a direction adapted to offset any transverse separating force.

When the squeezing is performed in a rolling mill, we have found that by passing the metals through a suitable restraining guide, or by pressing or holding the metals together between the squeezing operations, separation can be prevented. The operation of holding the metals together between the squeezing operations may also be accomplished by the application of tension to the partially bonded metal strips, for example by operating the second squeezing rolls at a higher speed than that employed for the initial squeezing rolls. Similarly, tension may thus be applied between any two squeezing operations. If one layer, in general the softer one, is under compressive stress, bending the strip so as to make this layer the convex side has been found to facilitate the task of preserving the initial bond. The number of discrete or nucleal bonds which must be developed by partial squeezing operations and accumulated from one squeezing operation to the next is determined by the nature of the metals and by the quality of the bond desired after the final sintering operation.

It is sometimes desirable to subject the metals to heating before the initial or any subsequent squeezing operation, in the manner described in said Patent 2,753,623. Heating may also be used between squeezing operations to cause growth of the incipient metal-to-metal bonds into a more extensive bond. Such treating usually makes it possible to achieve a bond with less over-all reduction and with less powerful equipment.

It will be understood from said Patents 2,691,815 and 2,753,623 that the surfaces of the metals which become interfacial surfaces are to be cleaned to eliminate barrier films before being placed in contact with each other. Where the metals are heated in a protective atmosphere to temperatures above approximately 500° F., this cleaning need remove only gross contaminants. Where the metals are not heated above this temperature, then the cleaning techniques set forth in said Patent 2,691,815 should be followed.

In one embodiment of our invention useful for the production of composite sheet and strip we use a plurality of rolling mills to accomplish the necessary deformation, whereby the rolls of the mills exert the forces required to press the metals together while simultaneously extending the areas of the mating surfaces.

The strength of the discrete or nucleal bond obtained by rolling two metals together in a given set of rolls is influenced by the cumulative reduction in the thickness of the metal strips or sheets in relation to the dimension of the rolls, the thickness of the metals prior to rolling and the work-hardening characteristics of the metals involved. Other factors are the presence of front and rear strip tension. In general, the greater the thickness and the greater the work-hardening characteristic of the metals, the greater is the amount of cumulative reduction required to form a sufficiently strong nucleal bond to overcome so-called alligatoring or separation. On the other hand, the greater the reduction in the squeezing operations, the smaller is the holding pressure required to counteract this tendency. The alligatoring or separating tendency may be overcome by mechanical means as will be described hereinafter.

Where practical, we prefer to work harden the softer metal before bonding in order to make its stiffness more nearly approach that of the metal to which it is to be joined. By this means we minimize the differential elongation of these metals and thus even more perfectly maintain the desired thickness ratio. This is particularly important for soft metals like aluminum or silver, and especially if the soft metal is not appreciably thinner than the hard metal. Moreover, the higher hardness of such work-hardened metal makes it possible to obtain greater pressure and higher stresses in the deformation step for a particular amount of reduction, and, as a result, more nucleal bonds.

The heat-treating or sintering step, after sufficient nucleal bonds are formed between the metals, is undertaken to transform the discrete or nucleal bonds into a substantially continuous bond. This may be done at temperatures above or below the recrystallization temperature of either or both metals, the bond improvement being a function of time and temperature, as taught in the aforesaid Patents 2,691,815 and 2,753,263. This heat treatment or sintering may be done by any method which heats the interface. In general, we prefer to sinter at temperatures above the recrystallization temperature of the metal having the lowest recrystallization temperature and below the temperature at which, for the particular combination of metals being sintered, brittle intermetallic compounds or liquid phases form. By sintering at such a temperature, not only is the time required for completing the bond greatly reduced but, incidentally, the metals are brought to a softer condition. However, as indicated, the sintering may be done at lower than recrystallization temperature where it is desired, for example, to keep the respective layers of metal in substantially the work-hardened condition induced by the deforming operation, in which case the time of the treatment needs to be increased considerably. The effect of sintering on the discrete or nucleal bonds is set forth in said Patents 2,691,815 and 2,753,623.

To illustrate the principle of our invention, we now describe in detail the manufacture of composite sheet and strip using a rolling mill as the deformation means.

In the accompanying drawings, in which several of various possible embodiments of the invention are shown, Fig. 1 is a diagrammatic elevation of apparatus for carrying out the invention by maintaining bonds between rolling mill operations;

Fig. 2 is a diagrammatic elevation of alternative apparatus for carrying out the invention; and, Fig. 3 is a diagrammatic elevation of another alternative apparatus for the purpose.

Similar reference characters indicate corresponding parts throughout the several views of the drawings.

In the manufacture of composite metals by first cleaning the contiguous surfaces, as by wire brushing and heating, and placing the metals in contact continuously through pressure rollers to effect a partial bonding by development of minute discrete or nucleal bonds, a limitation in the width and thickness of the metals which can be so processed arises by reason of the size of the equipment required to accomplish this purpose. In order to effect a satisfactory bonding by deformation of the metals, a substantial reduction in thickness, frequently of the order of 50% to 60% or more, must be achieved. Otherwise in many instances the bond which results is insufficient. To effect a substantial reduction in thickness in one operation, it is necessary to employ equipment which will exert great forces. The size and cost of such equipment is ordinarily increased many times with increases in the dimensions of the metals which are to be bonded.

Referring now to Fig. 1 of the drawings, which illustrates the first two steps of one form of our bonding process where the deformation step is performed by rolling, reference numerals 1 and 3 designate metal strips which are to be solid-phase bonded. The opposed surfaces of the two strips which become bonded are designated 5 and 7. As the strips travel to the rolling mill 9, they travel through a surface preparation apparatus 11 for removing the barrier films from surfaces 5 and 7 as described in said patents. The strips then travel through a sweep chamber 13, wherein loose dust is removed from the surfaces 5 and 7, as, for example, by blowing the dust off the surfaces and exhausting the blown-off dust. An example of such a sweep chamber is shown in the U. S. Patent 2,713,011 of George Durst for Method and Apparatus for Cleaning Metal Strips. From the sweep chamber, the strips travel to the rolling mill 9. Redeposition of dust on 5 and 7 must be prevented, for instance, by keeping the strips in contact with each other upon their emergence from the sweep chamber up to the rolling mill, as indicated at 15. This however is in the nature of a loose contact in the sense that no edgewise fastening means such as lineal welding are employed. The rolls of the rolling mill exert such pressure on the strips as to effect a substantial elongation of the mating surfaces while the metals are under contact pressure. In order that the increase in contact area shall be sufficient to carry out the invention, the percentage of reduction of the total thickness of the strips or sheets passing through the rolling mill 9 must be augmented by further rolling, without destroying the greater part of the discrete or nucleal bonds formed during the initial rolling operation.

In Fig. 1 there is shown, as a means for preserving these bonds, the curved passage of the metal strip or sheet from the rolling mill 9 over a set of hugging rolls 17, 19 and 21 and through a second rolling mill 23.

Fig. 2 illustrates another means for preserving the initial discrete or nucleal bonds created during the first rolling operation. In this figure there is provided after the rolling mill 9 a series of rollers on opposite sides of the composite metal strip. These rollers 25 are mounted on pressure heads 27. The pressure heads 27 may be pressed against opposite sides of the composite metal strip, as by means of plungers 29 through hydraulic or other means (not shown). In this way, the discrete or nucleal bonds formed during the first rolling operation through rolling mill 9 are preserved during the time the composite metal strip passes from the first rolling mill 9 through the second rolling mill 23.

Fig. 3 illustrates another means for preserving the initial bonds created during the first rolling operation. In this figure there is provided a pair of plates 31 between which the metal strips 1 and 3 are passed between rolling operations. The plates 31 are (as indicated by the arrows 2) forced by springs or hydraulic means against the metal strips 1 and 3 to permit the metal strips to pass therethrough, and serve as a guide for the strips to prevent their separation between rolling operations.

The apparatus and techniques of preparing the metals for bonding, and of handling the metals prior to the first squeezing operation, are all described in said patents, and reference is made thereto for a complete description. Patent 2,691,815 describes the techniques to be used when the temperature of the materials prior to entering the squeezing means is below the recrystallization temperature of that metal having the lowest such temperature; and Patent 2,753,623 describes the techniques for cases wherein the temperature is higher.

A variety of combinations of heating, rolling and sintering with preservation of discrete or nuclear bonds between reduction operations may be practiced within the scope of this invention. Illustrative of the sequences of operation which may be practiced according to this invention are the following:

(1) Two partial reductions with intermediate preservation of the initial bond, followed by sintering;

(2) Partial reduction, application of heat, partial reduction, with preservation of the heat-treated bond formed by the first partial reduction, and sintering;

(3) Heating, two partial reductions with intermediate preservation of the bond, followed by sintering;

(4) Three partial reductions with intermediate preservation of the bonds initially formed and accumulated, followed by sintering;

(5) Heating, partial reduction, heating, two additional partial reductions with intermediate preservation of the initial and accumulated bonds, followed by sintering; and, (6) Two partial reductions with preservation of the initial bond, heating with preservation of the accumulated bonds, partial reduction and sintering.

The following examples will serve to illustrate the methods of the present invention:

Example I

Two rolling mills are placed in tandem and bolted to a base. Heavy braces between the mills are provided. The work rolls of the first mill are 5 inches in diameter. The work rolls of the second mill are 4 inches in diameter. The distance between the two roll gaps is approximately 28 inches. The idling speed of the first mill is 36 feet per minute and that of the second mill 54 feet per minute. The metals bonded in this instance are (a) an alloy consisting of 92% copper, 1% tin and 7% zinc, and (b) fine silver. The alloy strip has a thickness of 0.090 inch and a width of 1 inch. The fine silver has a thickness of 0.020 inch and a width of 1 inch. The metals are in the soft stage. The metal surfaces to be bonded are meticulously cleaned as described in said Patent 2,691,815 before being placed together and passed through the mills. A 36% reduction in thickness of the combined metals is effected in the first mill and a 29% reduction (based on the thickness of the material after the first reduction) in the second mill, thus giving a total of approximately 54% reduction. To prevent alligatoring and destruction of the discrete or nucleal bonds formed during the initial partial reduction, tension is applied to the metal strip by operating the second mill at a speed somewhat in excess of the speed with which the stock issues from the first mill. The composite metal strip issuing from the second mill is sintered at 1100° F. for two minutes. The bond thus formed between the metals is entirely satisfactory from a commercial standpoint in that the metals remain bonded even after severe flexing, stamping and drawing operations.

Example II

The procedure of Example I is applied in the bonding of the following pairs of metals:

Copper (0.020 inch thick and 1 inch wide)
SAE 1010 Steel (0.090 inch thick and 1 inch wide)

A 35% reduction in thickness of the combined metals is accomplished in each of the two rolling mills, the second percentage of reduction being based on the thickness of the composite material after the first reduction, thus giving a total of approximately 58% reduction. The composite strip is sintered at 1200° F. for ten minutes. A commercially satisfactory bond is achieved.

Example III

Strips of soft copper .010 inch thick and SAE 1010 soft steel .090 inch thick are cleaned by sanding and sent in one pass through a rolling mill at a 28% reduction and a first bond effected to produce a .072 inch combined thickness of the resulting composite discretely or nucleally bonded strip. In order to maintain the first weak bond the composite strip is maintained in a curved condition upon emergence from the rolling mill and briefly heated to approximately 1150° F. This results in a fair bond. The composite strip is then rerolled in two more passes with an accumulated total reduction of 60%, arriving at a .040 inch combined thickness. After a final heat-sintering step, a final commercially satisfactory bond is obtained.

Example IV

Strips of soft copper .010 inch thick and SAE 1010 cold rolled steel .090 inch thick (of 210 Vickers hardness) are cleaned by sanding and sent in one pass through a rolling mill where a reduction of 28% and a first bond are effected, to produce a .072 inch combined thickness of the resulting composite discretely or nucleally bonded strip. In order to maintain the resulting first bond, the composite strip is maintained in a curved condition upon emergence from the rolling mill and briefly heated to approximately 700° F. This results in a fair bond. The composite strip is then rerolled once, with a cumulative reduction of 44%, arriving at a gauge of .056 inch combined thickness. After a brief final heat sintering at 1100° F., a good bond is obtained.

Example V

Strips of soft fine silver .020 inch thick and soft nickel .090 inch thick are manipulated as in Examples III or IV, except that a first reduction of 32% is used, which results in the silver and nickel barely holding together. Rerolling is effected in two passes of approximately 30% each, the total accumulated reduction amounting to 69%. After the rerolling, the bond is difficult to destroy and after the final sintering operation, destruction is nearly impossible.

It will be seen that the method herein described briefly comprises suitably preparing the areas of the components which are to be bonded, so as to eliminate films which would otherwise act as barriers to the bonding. With the barrier film eliminated, the surfaces are placed in interfacial contact and subjected to a sequence of at least two successive squeezing operations, each of which effects only a sufficient deformation with concomitant increase in interfacial area to establish an increment of bond strength increase which is only a minor fraction of the final bond strength. Thus more economical squeezing machinery may be used than would be the case in a one-step squeezing method. During the interval between successive squeezing operations, the incompletely bonded composite stock is subjected to measures which will prevent the attained partial bond strength from being weakened by strains and stresses, thereby avoiding separation. The sintering after the final squeezing operation which is effected on the partially bonded composite stock develops the incomplete bond into a substantially complete continuous bond. This final sintering occurs at a temperature lying within the range which extends from approximately the recrystallization temperature of the metal having the lowest recrystallization temperature to that temperature at which brittle intermetallic compounds or liquid phase material occur, whichever is the lower.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

We claim:

1. The method of interfacially solid-phase bonding malleable metal components which have eliminated from their faces to be interfacially bonded gross contaminants and films which would act as a barrier to bonding, said components being free of any side edge welding adapted to hold them together as an assembled unit, comprising subjecting said components to a temperature which is in a range which is lower than the hot-short temperature of the metal having the least hot-short temperature or lower than the temperature at which interfacial liquid phase material or a brittle intermetallic compound would form in appreciable amount, whichever temperature is the lower, squeezing the components together substantially in said temperature range with concomitant increase in the interfacial area at a reduction adapted to effect a first formation of a multitude of discrete bonds with a first integrated strength of said discrete bonds which is only a minor fractional part of the final bond strength, applying a force to the partially bonded components in a direction adapted to offset any transverse separating forces therebetween incurred as the components emerge from said squeezing operation, holding the components together under said force, then while subject to said holding force again at least once squeezing said components together in said temperature range and at a reduction adapted to produce additional bond formation which with the first bond formation has a subsequent integrated bond strength larger than said minor fractional part of final bond strength but still a fractional part of said final bond strength, and subsequently heating the components as held together with said larger bond strength, said last-named heating being at a temperature lying within the range which extends from approximately the recrystallization temperature of the metal component having the lowest recrystallization temperature to a point below one of those temperatures, whichever is the lower, at which liquid phase material would form, or at which a brittle intermetallic compound would form in appreciable amount, said heating being continued for such a length of time as to effect growth of the bonds, thereby to increase the over-all bond strength.

2. The method of solid-phase bonding malleable metal components as set forth in claim 1, wherein said step of applying force to the partially bonded components which occurs between said squeezing steps comprises pressing and holding said components together with transverse pressure across their partially bonded interfaces.

3. The method of solid-phase bonding malleable metal components as set forth in claim 1, wherein said step of applying force to the partially bonded components which occurs between said squeezing steps comprises tensioning the bonded components during their passage between said squeezing steps in a direction approximately along their interfacial partial bond, whereby said separating forces across the bonded interfaces are substantially offset.

4. The method of solid-phase bonding malleable metal components as set forth in claim 1, wherein said step of applying force to the partially bonded components which occurs between said squeezing steps comprises heating the components at a temperature lying within the range which extends from approximately the recrystallization temperature of the metal component having the lowest recrystallization temperature to a point below one of those temperatures, whichever is the lower, at which liquid phase material would form or at which a brittle intermetallic compound would form in appreciable amount.

5. The method of solid-phase bonding malleable metal components as set forth in claim 1, wherein said step of applying force to the partially bonded components which occurs between said squeezing steps comprises forcing the partially bonded components along a curved trajectory in passing between said reduction steps.

6. The method of solid-phase bonding malleable metal components as set forth in claim 5, wherein if one component is softer than the other the softer is on the convex side of the trajectory.

References Cited in the file of this patent

UNITED STATES PATENTS

| | | |
|---|---|---|
| 2,627,010 | Matteson et al. | Jan. 27, 1953 |
| 2,691,815 | Boessenkool | Oct. 19, 1954 |
| 2,707,323 | Watson | May 3, 1955 |

OTHER REFERENCES

The Making, Shaping and Treating of Steel, fifth edition, chapters VII, VIII and IX; published by Carnegie-Illinois Steel Corp., Pittsburgh, Pa.